(12) United States Patent
Biswas et al.

(10) Patent No.: US 11,281,627 B2
(45) Date of Patent: Mar. 22, 2022

(54) FACILITATING QUICK EVALUATION OF TRIGGER CONDITIONS FOR BUSINESS RULES THAT MODIFY CUSTOMER SUPPORT TICKETS

(71) Applicant: Zendesk, Inc., San Francisco, CA (US)

(72) Inventors: Sanjeev Kumar Biswas, Singapore (SG); Vancheswaran Koduvayur Ananthanarayanan, San Francisco, CA (US)

(73) Assignee: Zendesk, Inc., San Francisco, CA (US)

( * ) Notice: Subject to any disclaimer, the term of this patent is extended or adjusted under 35 U.S.C. 154(b) by 0 days.

(21) Appl. No.: 17/132,745

(22) Filed: Dec. 23, 2020

(65) Prior Publication Data

US 2022/0019556 A1    Jan. 20, 2022

Related U.S. Application Data

(63) Continuation-in-part of application No. 16/932,199, filed on Jul. 17, 2020.

(51) Int. Cl.
  *G06F 16/16*    (2019.01)
  *G06Q 30/00*    (2012.01)
  *G06Q 10/06*    (2012.01)
  *G06F 16/17*    (2019.01)

(52) U.S. Cl.
  CPC ........... *G06F 16/16* (2019.01); *G06Q 10/067* (2013.01); *G06Q 30/016* (2013.01); *G06F 16/1734* (2019.01)

(58) Field of Classification Search
  CPC ..... G06F 16/16; G06Q 10/067; G06Q 30/016
  See application file for complete search history.

(56) References Cited

U.S. PATENT DOCUMENTS

| | | | |
|---|---|---|---|
| 6,401,119 B1 * | 6/2002 | Fuss | G06F 11/3006 709/224 |
| 7,237,138 B2 * | 6/2007 | Greenwald | G06F 11/2257 714/4.3 |
| 7,266,734 B2 * | 9/2007 | Chavez, Jr | G06F 1/28 714/26 |

* cited by examiner

*Primary Examiner* — Esther B. Henderson
*Assistant Examiner* — Nazia Naoreen
(74) *Attorney, Agent, or Firm* — Park, Vaughan, Fleming & Dowler LLP

(57) ABSTRACT

When a customer-support ticket is created or updated in an online customer-support system, the system applies a set of triggers, which modify the ticket based on business rules, to the ticket, wherein each trigger performs actions that modify the ticket when conditions for parameters associated with the ticket are satisfied. During this process, the system evaluates condition nodes in condition graphs for the set of triggers, wherein a condition graph for a trigger is a directed graph comprised of condition nodes that specify conditions on one or more parameters associated with the ticket. During this evaluation, if a valid path through a condition graph comprising satisfied condition nodes is discovered, the system fires a trigger associated with the condition graph. Also, while evaluating the condition nodes, the system performs one or more range-searching operations to quickly evaluate conditions for frequently occurring parameters in the condition graphs.

26 Claims, 17 Drawing Sheets

```
ACME support@acme.com - ACME Support

If Ticket is New
   AND Current Via is Email
   AND Brand is "X178908"
   AND (recipient is support@acme.com
      OR recipient is support@acme.zendesk.com)

Then Tags include "acme_at"
   AND Ticket Form is "OneForm"
   AND Ticket Field is "Department" is "Finance"
   AND Ticket Field "Issue Type" is "Urgent"
```

FIG. 4

ArrayList<Interval> finalResIntervals;//List of valid intervals which contains the search param
ArrayList<RangeSet> finalRangeSet;//List of sequential ranges which contains the search param

Method: Search(x=v)::
Given x = v ( for some value of v in Real numbers )
Perform a binary search on the RangeIndexes.
Case 1: Failed to find an exact match but finished search at an index i;
a.   if(v < rangeindexes[i])
i.   if( i - 1 < 0) return NULL;//search value does exist
ii.   Else ProcessRanges(i,v)
b.   Else
i.   if( i + 1 > M) return NULL;//search value does not exist
ii.   Else ProcessRanges(i,v)
Case 2: Found exact match at index i;
c.   ProcessRanges(i, v)
//Append all condition ids of finalRangeSet and return them
Return finalRangeSet.appendedList().

Method: ProcessRanges(index, q)::
int l_most_index = -1, r_most_index = -1;
int runner_index = 1;
//if the rangeindexes[index] == rangeindexes[index-1] or == [index-2]...or == [index-n]
//provided index-i >= 0 for all i in 0 to n
//find leftmost index where the value is diff l_most_index. This is done to manage duplicate range indexes on the left side (if any).
while( index - runner_index >= 0 )
{
   if(rangeIndexes[index] == rangeIndexes[index-runner_index]) ++runner_index;
   else break;
}
if( q == rangeindexes[index] || q < rangeindexes[index] ) l_most_index = index - runner_index;
else l_most_index = index; //if search value is ≤ rangeindex[index]use left most found index else current index value.
runner_index = 1;
//if the rangeindexes[index] == rangeindexes[index+1] or == [index+2] or == [index+n]
//provided index+i < size_rangeIndexes
//find rightmost index where the value is diff r_most_index. This is done to manage duplicate range indexes on the right side (if any).

FIG. 9A

```
while( index + runner_index < size_rangeIndexes )
{
    if(rangeIndexes[index] == rangeIndexes[index+runner_index]) ++runner_index;
    else break;
}
if( q == rangeindexes[index] || q > rangeindexes[index]) r_most_index = index + runner_index;
else r_most_index = index;//if search value is ≥ rangeindex[index] use the right most found index else current index value.
if(l_most_index < 0) l_most_index = 0;
if(r_most_index >= size_rangeIndexes) r_most_index = size_rangeIndexes-1;
Interval temp ;
for(int i = l_most_index; i+1 <= r_most_index;)
{//Merging the intervals
    temp = new MyInterval(rangeIndexes[i], rangeIndexes[i+1], 1);
    finalResIntervals.add(temp);
    ++i;
}
int i_size = finalResIntervals.size();
for(int i=0; i < i_size;++i) {//Adding the rangset and also making sure duplicate ranges are handled
    finalRangeSet.add(finalSets.get(finalResIntervals.get(i)));}
Return;
```

FIG. 9B

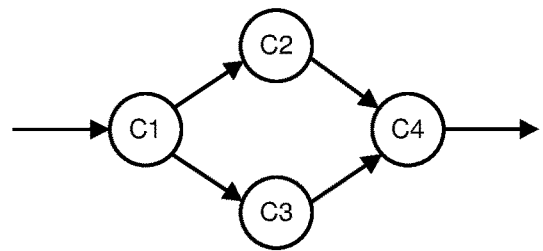
FIG. 10A
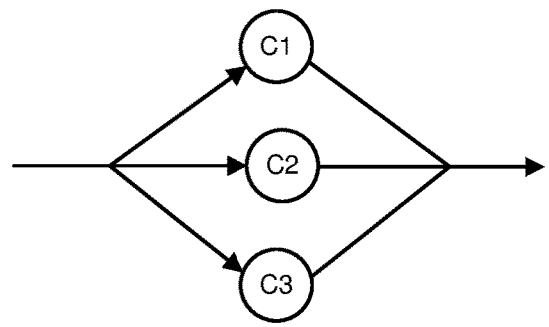
FIG. 10B
| condition | condition intervals | boundaries |
|---|---|---|
| p < v | [MIN_VALUE, v) | MIN_VALUE, v |
| p <= v | [MIN_VALUE to v] | MIN_VALUE, v |
| p > v | (v, MAX_VALUE] | v, MAX_VALUE |
| p >= v | [v, MAX_VALUE] | v, MAX_VALUE |
| p == v | [v, v] | v |
| p != v | [MIN_VALUE,v), (v, MAX_VALUE) | MIN_VALUE, v, MAX_VALUE |
FIG. 11

| Critical conditions for parameter p | condition intervals | Sequential intervals | Excluded sequential intervals |
|---|---|---|---|
| C1: (p < 10) | [0, 10) | [0,0] , (0, 10), [10, 10], (10, 20), [20, 20], (20, 100), [100,100] | C1: [10, 10], (10, 20), [20,20], (20, 100), [100,100] |
| C2: (p > 20) | (20, 100] | | C2: [0,0], (0, 10), [10, 10], (10, 20), [20, 20] |

| conditions | condition intervals | Sequential intervals | Excluded sequential intervals |
|---|---|---|---|
| C1: (p != 10) | [0, 10), (10, 100] | [0,0] , (0,5), [5,5], (5, 10), [10, 10], (10, 100), [100,100] | C1: [10, 10] |
| C2: (p > 5) | (5, 100] | | C2: [0,0], (0, 5), [5, 5] |

| parameter | Sequential interval | Key (string) | Value (list of trigger IDs) |
|---|---|---|---|
| "p0" | (0, 10) | "p0:(0, 10)" | [t1, t2, t4, t8] |
| "p0" | (10, 20) | "p0:(10, 20)" | [t9] |
| "p1" | [10, 10] | "p1:[10, 10]" | [t1, t3] |

FIG. 14A

| Trigger | Critical conditions | OFF trigger map | Merged OFF Trigger map |
|---|---|---|---|
| T1 | P0 > 5<br>P0 < 10 | [0, 0]   -> T1, T2, T3<br>(0, 3)   -> T1, T2, T3<br>[3, 3]   -> T1, T2, T3<br>(3, 5)   -> T1, T2<br>[5, 5]   -> T1, T2<br>(5, 10)  -> []<br>[10, 10] -> T1<br>(10, 100) -> T1<br>[100, 100] -> T1 | [0, 3]    -> T1, T2, T3<br>(3, 5]    -> T1, T2<br>(5, 10)   -> []<br>[10, 100] -> T1 |
| T2 | P0 > 5 | | |
| T3 | P0 > 3 | | |
| Sequential Intervals for P0, before and after: | | [0, 0], (0, 3), [3, 3],<br>(3, 5), [5, 5], (5, 10),<br>[10, 10], (10, 100),<br>[100, 100], | [0, 3], (3, 5), (5, 10),<br>[10, 100] |

FIG. 14B

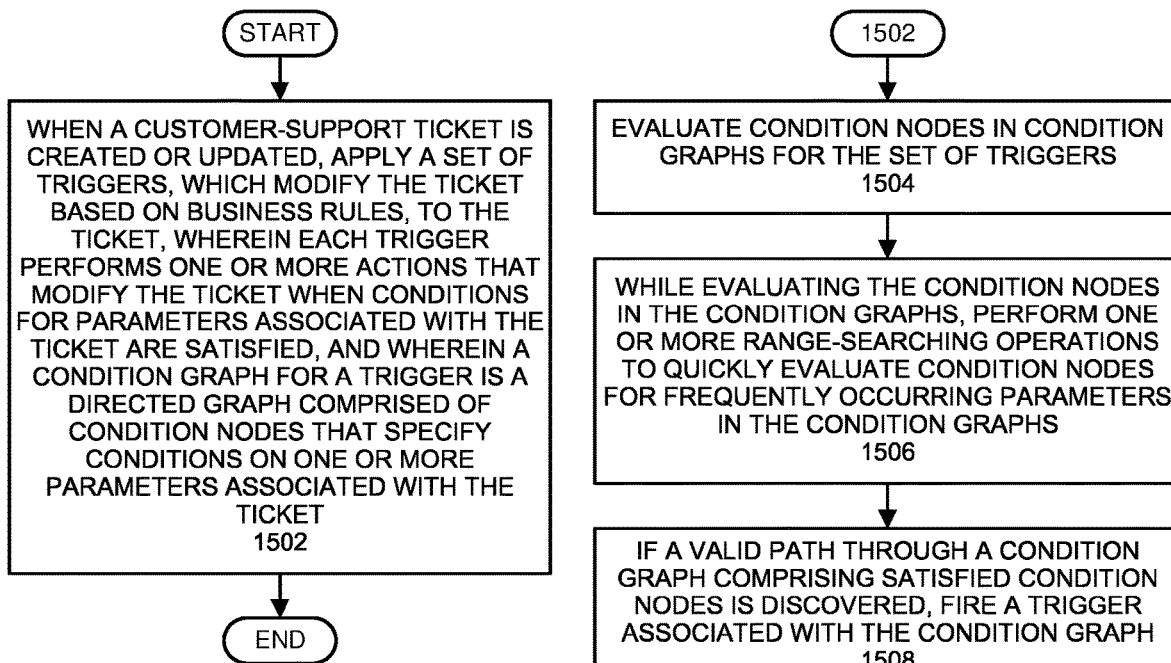
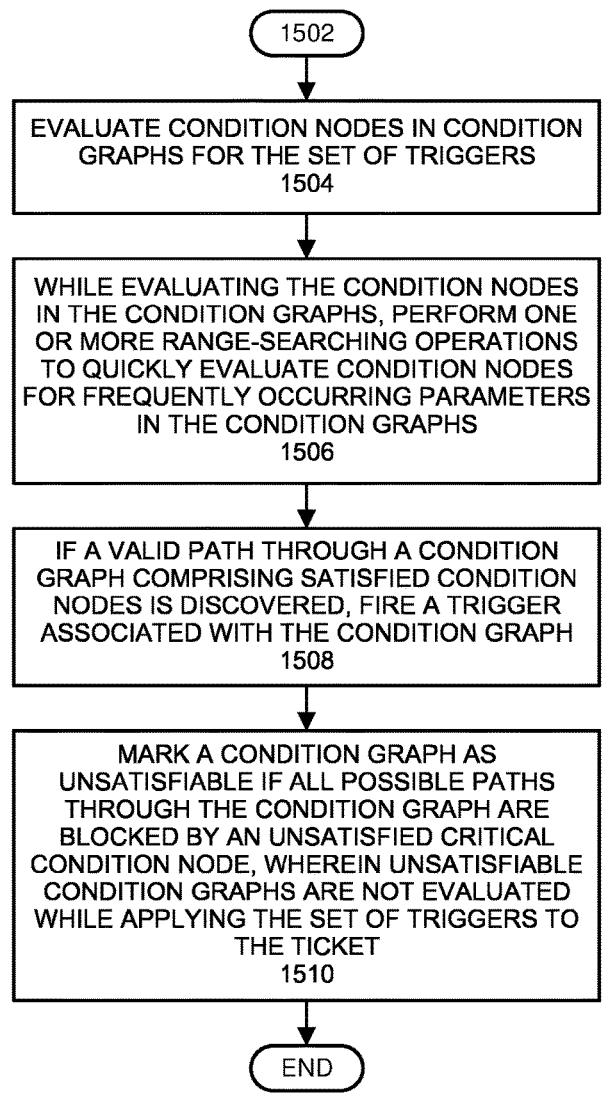
FIG. 15A
FIG. 15B

FACILITATING QUICK EVALUATION OF TRIGGER CONDITIONS FOR BUSINESS RULES THAT MODIFY CUSTOMER SUPPORT TICKETS

CROSS-REFERENCE TO RELATED APPLICATION

This application is a continuation-in-part of, and hereby claims priority under 35 U.S.C. § 120 to, pending U.S. patent application Ser. No. 16/932,199, entitled "Providing Fast Trigger Matching to Support Business Rules that Modify Customer-Support Tickets," by inventors Sanjeev Kumar Biswas and Vancheswaran Koduvayur Ananthanarayanan, filed on 17 Jul. 2020, the contents of which are hereby incorporated herein by reference.

BACKGROUND

Field

The disclosed embodiments generally relate to the design of customer-support resources for e-commerce systems. More specifically, the disclosed embodiments relate to a customer-support system that facilitates quick evaluation of trigger conditions for business rules that automatically modify customer-support tickets.

Related Art

As electronic commerce continues to proliferate, customers are beginning to use online customer-service resources to solve problems, and to obtain information related to various products or services. These online customer-service resources commonly include customer-support ticketing systems, which are designed to help customers, by: providing helpful information to the customers; directing customers to specific workflows; or facilitating interactions with customer-support agents. When designed properly, these online customer-support resources can automate many customer-support interactions, thereby significantly reducing a company's customer-support costs.

While processing tickets, it can be advantageous to apply predefined business rules, which are based on triggers, to automatically modify the tickets. For example, if a ticket relates to a problem in shipping a time-critical item, the business rule can cause the priority of the ticket to be increased. In another example, if the ticket originates from an email address that is associated with malicious emails, a business rule can cause the ticket to be automatically suspended. Note that automatically applying these business rules to tickets eliminates the need to manually modify tickets. This increases the speed at which tickets are processed, and reduces the amount of work that customer-support agents need to perform while processing tickets.

However, applying these types of business rules efficiently requires the associated triggers to be evaluated quickly, wherein evaluating each trigger typically involves evaluating multiple trigger conditions. Moreover, large customer accounts tend to use many business rules, and this means they make use of a large number of triggers to control their ticket life cycle. Hence, the more triggers an account has, the more complex the associated evaluations become, which can significantly slow down execution. The delays involved in processing triggers and associated trigger conditions can cause large customers to become dissatisfied, which makes it hard to maintain acceptable customer relationships.

Therefore, what is needed is a customer-support system that facilitates quick evaluation of trigger conditions to support business rules that automatically modify customer-support tickets.

SUMMARY

The disclosed embodiments relate to a system that automatically updates a customer-support ticket in an online customer-support system. During operation, when the customer-support ticket is created or updated, the system applies a set of triggers, which modify the ticket based on business rules, to the ticket, wherein each trigger in the set of triggers performs one or more actions that modify the ticket when conditions for parameters associated with the ticket are satisfied. During this process, while applying the set of triggers to the ticket, the system evaluates condition nodes in condition graphs for the set of triggers, wherein a condition graph for a trigger is a directed graph comprised of condition nodes that specify conditions on one or more parameters associated with the ticket. While evaluating the condition nodes in the condition graphs, the system performs one or more range-searching operations to quickly evaluate condition nodes for frequently occurring parameters in the condition graphs. During the evaluation, if a valid path through a condition graph comprising satisfied condition nodes is discovered, the system fires a trigger associated with the condition graph.

In some embodiments, the system marks a condition graph as unsatisfiable if all possible paths through the condition graph are blocked by an unsatisfied critical condition node, wherein unsatisfiable condition graphs are not evaluated while applying the set of triggers to the ticket.

In some embodiments, the one or more range-searching operations are performed during runtime, after trigger firings cause frequently occurring parameters to be modified.

In some embodiments, the system additionally performs preprocessing operations to identify critical condition nodes, and to perform range computations to produce range sets and associated range indexes for frequently occurring parameters associated with critical condition nodes, which facilitates subsequent range-searching operations.

In some embodiments, while performing a range-searching operation, the system performs a binary search for a parameter value based on range indexes to quickly evaluate conditions by accessing associated range sets.

In some embodiments, prior to runtime, the system converts each condition graph into one or more linear trigger paths through condition nodes in the condition graph, wherein the one or more trigger paths are subsequently evaluated to determine whether the associated trigger will fire, and wherein a trigger path becomes unsatisfiable whenever a condition node in the trigger path is evaluated as unsatisfied, wherein unsatisfiable trigger paths are not evaluated while applying the set of triggers to the ticket.

In some embodiments, triggers in the set of triggers are applied to the ticket in a precedence ordering.

In some embodiments, after a ticket is updated as a result of firing a trigger, the system: identifies one or more parameters in the ticket that were modified by the trigger; unmarks condition nodes that depend on the modified parameters, wherein the unmarking process sets a condition node to be in an undecided state; and continues to apply the set of triggers to the ticket restarting at the beginning of the precedence ordering while removing the fired trigger from future consideration.

In some embodiments, the system completes the process of applying the set of triggers to the ticket when all unfired triggers in the set of triggers have been evaluated without causing a trigger to fire.

In some embodiments, a trigger can be associated with one or more of the following actions: changing a priority of a ticket; changing an assignee for the ticket; assigning a group of customer-support agents to the ticket; changing a state in a life cycle of the ticket; and changing a ticket type for the ticket.

In some embodiments, a trigger can be associated with conditions that are based on the following: a status of the ticket; a language of the ticket; a requester who caused the ticket to be created; a brand associated with the ticket; and how the ticket arrived at the customer-support system.

The disclosed embodiments also relate to another system that automatically updates a customer-support ticket in an online customer-support system, comprising. During operation, when the customer-support ticket is created or updated, the system apples a set of triggers to the ticket, wherein each trigger in the set of triggers fires when conditions for parameters associated with the ticket are satisfied and performs one or more actions that modify the ticket, and wherein each trigger in the set of triggers is associated with a condition graph comprised of condition nodes that specify conditions on one or more parameters associated with the ticket. While applying the set of triggers to the ticket, the system updates a list of off triggers that cannot fire because a critical condition is not satisfied. Next, the system performs the following operations until all unfired triggers in the set of triggers have been evaluated without causing a trigger to fire: (1) for each trigger in the set of triggers, which is not in the list of off triggers, the system evaluates condition nodes in a condition graph for the trigger; and (2) if a valid path through the condition graph comprising satisfied condition nodes is discovered, the system fires the trigger and updates the list of off triggers to account for parameters that change due to the trigger firing.

In some embodiments, the system performs the following preprocessing operations to facilitate updating the list of off triggers. First, the system identifies a set of critical conditions for each trigger in the set of triggers, wherein a critical condition for a trigger appears in all paths through a condition graph for the trigger. Next, the system selects a set of parameters to evaluate, wherein each selected parameter is associated with a critical condition that affects more than a threshold number of triggers. Then, for each selected parameter, the system creates sequential intervals for the parameter based on critical conditions associated with the parameter. Next, the system produces an off triggers map that maps each sequential interval to an associated set of off triggers. Finally, the system merges sequential intervals if possible, and updates the off triggers map accordingly.

In some embodiments, updating the list of off triggers involves performing range-searching operations to identify sequential intervals for critical parameters, and looking up the identified sequential intervals in the off triggers map to identify off triggers to include in the list of off triggers.

In some embodiments, performing the range-searching operations involves performing binary searches for parameter values based on a range sets and range indexes for the sequential intervals to quickly identify the sequential intervals associated with the off triggers.

BRIEF DESCRIPTION OF THE FIGURES

FIG. 4 presents a textual representation of a trigger in accordance with the disclosed embodiments.

FIG. 9A presents a first section of the pseudocode that performs condition-evaluation operations in accordance with the disclosed embodiments.

FIG. 9B presents a second section of the pseudocode that performs condition-evaluation operations in accordance with the disclosed embodiments.

FIG. 10A presents an exemplary condition graph in accordance with the disclosed embodiments.

FIG. 10B presents another exemplary condition graph in accordance with the disclosed embodiments.

FIG. 11 presents a table of condition intervals in accordance with the disclosed embodiments.

FIG. 14A presents an exemplary table for an off trigger map in accordance with the disclosed embodiments.

FIG. 14B presents an exemplary table for a merged off trigger map in accordance with the disclosed embodiments.

FIG. 15A presents a flow chart illustrating an operation that applies a set of triggers to a ticket in accordance with the disclosed embodiments.

FIG. 15B presents a flow chart illustrating operations performed while applying the set of triggers to a ticket in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
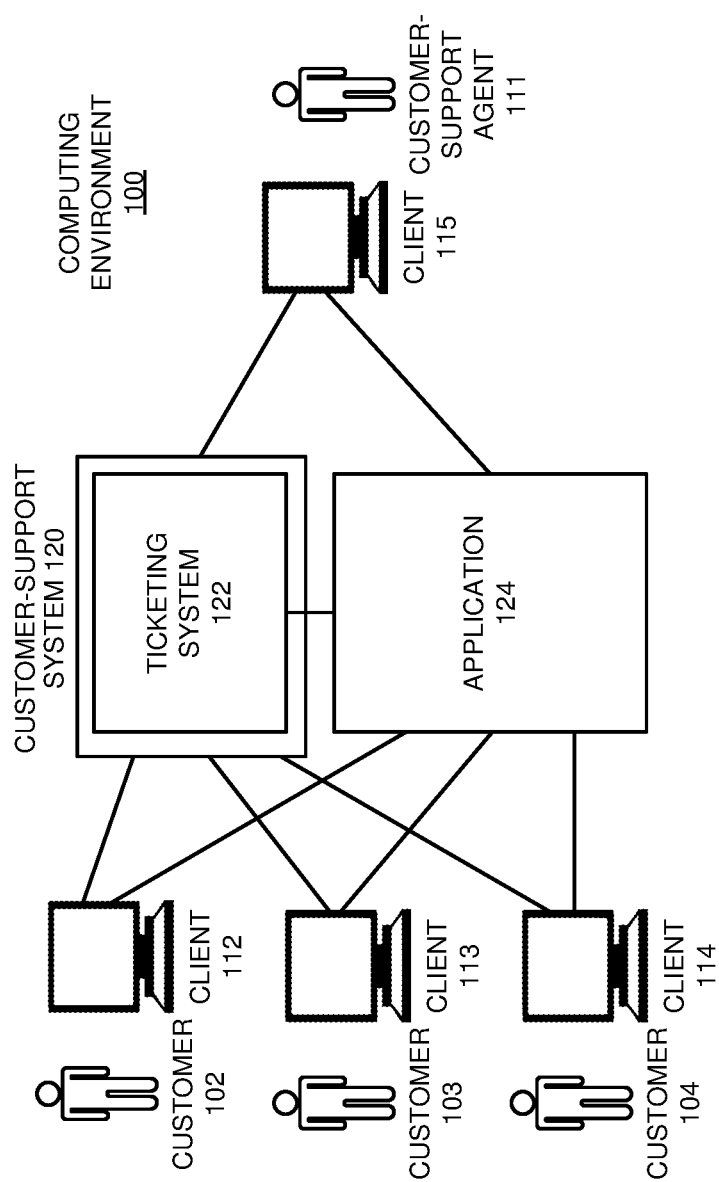
FIG. 1 illustrates a computing environment including an application and an associated customer-support system in accordance with the disclosed embodiments.

Before discussing the above-described ticket-modification technique further, we first describe an exemplary computing environment in which it can operate. FIG. 1 illustrates an exemplary computing environment 100 in which a trigger-based ticket-modification system operates. At the highest level, computing environment 100 includes an application 124 and ticketing system 122. Within computing environment 100, a number of customers 102-104 interact with application 124 through client computer systems 112-114, respectively. Application 124 is provided by an organization, such as a commercial enterprise, to enable customers 102-104 to perform various operations associated with the organization, or to access one or more services provided by the organization. For example, application 124 can include online accounting software that customers 102-104 can access to prepare and file tax returns online. In another example, application 124 provides a commercial website for selling sporting equipment. Note that application 124 can be hosted on a local or remote server.

If customers 102-104 have problems or questions about application 124, they can access a customer-support system 120 to obtain help dealing with issues, which can include various problems and questions. For example, a user of accounting software may need help using a feature of the accounting software, or a customer of a website that sells sporting equipment may need help cancelling an order that was erroneously entered. This help may be provided by a customer-service agent 111 who operates a client computing system 115 and interacts with customers 102-104 through customer-support system 120. This help may also involve automatically suggested helpful articles that the customer can read to hopefully resolve the problem or question. Note that customer-service agent 111 can access application 124 (either directly or indirectly through customer-support system 120) to help resolve an issue.

In some embodiments, customer-support system 120 is not associated with computer-based application 124, but is instead associated with another type of product or service that is offered to a customer. For example, customer-support system 120 can provide assistance with a product, such as a television, or with a service, such as a package-delivery service.

Customer-support system 120 organizes customer issues using a ticketing system 122, which generates tickets to represent each customer issue. Ticketing systems are typically associated with a physical or virtual "help center" (or "help desk") for resolving customer problems. Ticketing system 122 comprises a set of software resources that enable a customer to resolve an issue. Specific customer issues are associated with abstractions called "tickets," which encapsulate various data and metadata associated with the customer requests to resolve an issue. (Within this specification, tickets are more generally referred to as "customer requests.") An exemplary ticket can include a ticket identifier, and information (or links to information) associated with the problem. For example, this information can include: (1) information about the problem; (2) customer information for one or more customers who are affected by the problem; (3) agent information for one or more customer-service agents who are interacting with the customer; (4) email and other electronic communications about the problem (which, for example, can include a question posed by a customer about the problem); (5) information about telephone calls associated with the problem; (6) timeline information associated with customer-service interactions to resolve the problem, including response times and resolution times, such as a first reply time, a time to full resolution and a requester wait time; and (7) effort metrics, such as a number of communications or responses by a customer, a number of times a ticket has been reopened, and a number of times the ticket has been reassigned to a different customer-service agent.

The operation of customer-support system 120 is described in further detail below.

Customer-Support System

Figure 2:
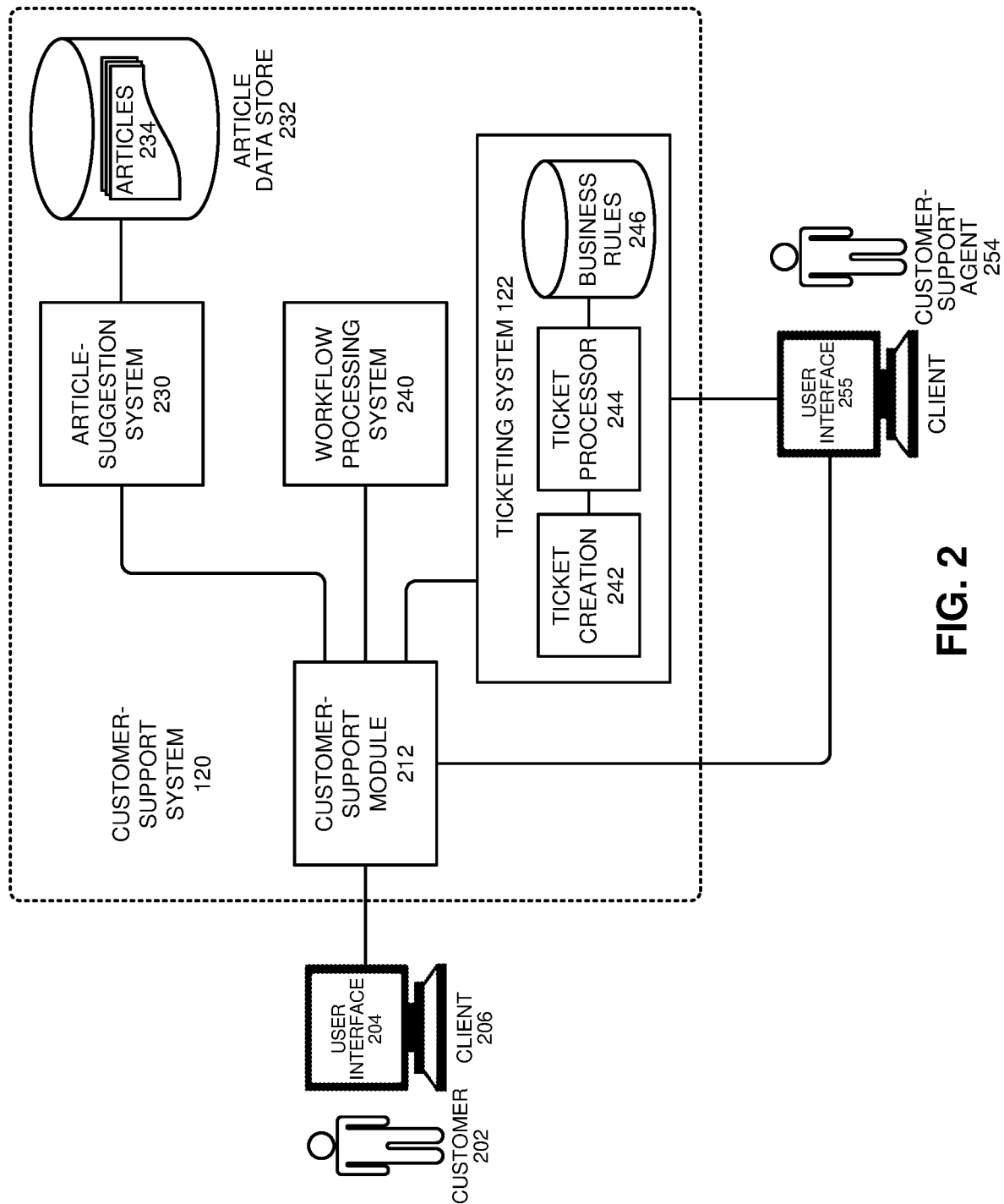
FIG. 2 illustrates various components in the customer-support system in accordance with the disclosed embodiments.

FIG. 2 illustrates how a customer 202 interacts with customer-support system 120 in accordance with the disclosed embodiments. A customer 202, who has an issue with a product or a service associated with application 124, interacts with customer-support system 120 through a user interface 204 in a client system 206. During this process, customer 202 submits a request to customer-support system 120 to obtain help with the issue, thereby initiating an automated customer-support interaction. (Note that user interface 204 can be implemented in a number of different ways for both mobile and desktop platforms. For example, user interface 204 can be incorporated into: a web page, an email, or a UI screen provided by an application.)

The request from customer 202 is directed to a customer-support module 212 within customer-support system 120. Customer-support module 212 can perform various responsive customer-support actions. For example, customer-support module 212 can cause customer 202 to receive one or more helpful articles from an article-suggestion system 230 to facilitate resolving the customer's issue. During this process, article-suggestion system 230 obtains the one or more helpful articles from a set of help center articles 234 contained in an article data store 232.

Customer-support module 212 can also trigger a predefined workflow from workflow processing system 240 to help resolve the customer's issue. For example, the predefined workflow can be associated with one or more of the following: obtaining status information for an order; changing a delivery address for an order; issuing a refund for an order; issuing an exchange for an order; resetting the customer's password; updating details of the customer's account; and canceling the customer's account.

As another alternative, customer-support module 212 can put the customer 202 in touch with a human customer-support agent 254 to help resolve the customer's issue. The customer's issue will hopefully be resolved through one or more of these customer-support actions.

Customer-support module 212 makes use of ticketing system 122 (described above) to keep track of customer requests. To facilitate processing customer requests, tickets from ticketing system 122 are typically presented to customer-support agent 254 through a user interface 255. Ticketing system 122 includes a ticket creation module 242, which creates tickets in response to communications from customers. It also includes a ticket processor 244, which performs various operations to facilitate processing tickets. When a ticket is created or updated, ticket processor 244 automatically applies various triggers associated with business rules 246 to the ticket to automatically update parameters in the ticket as is described in more detail below.

Trigger Processing

Figure 3:
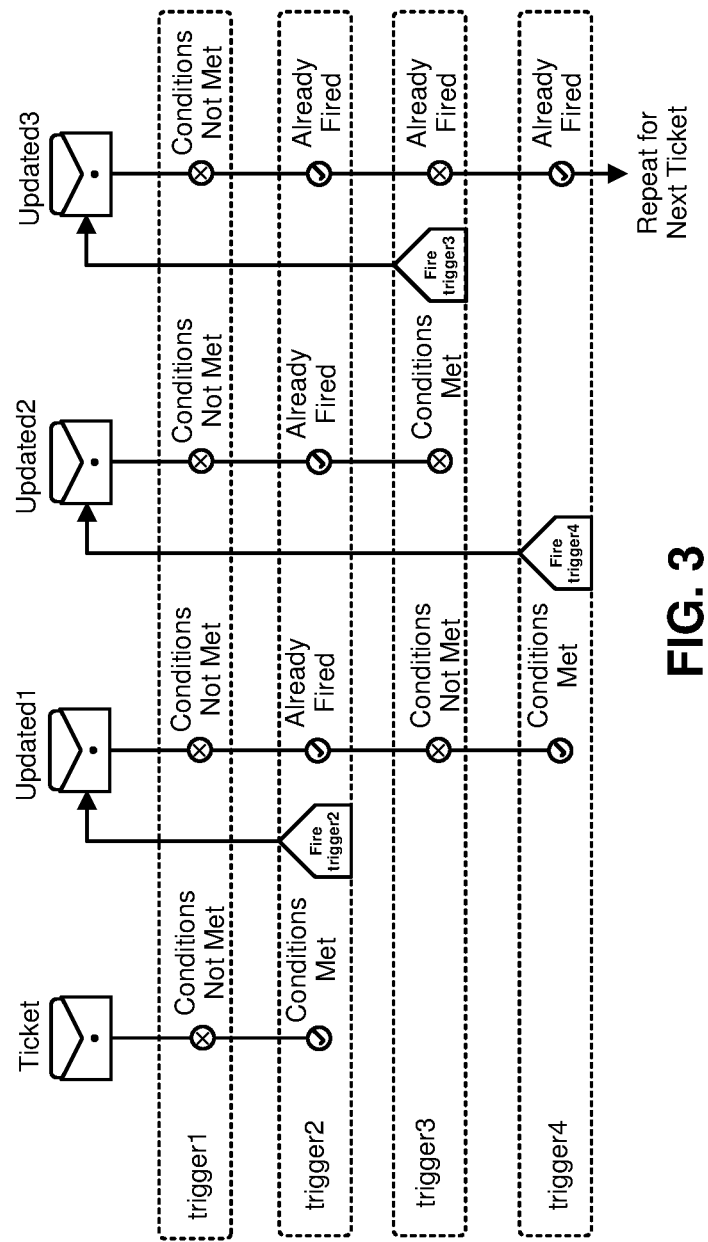
FIG. 3 illustrates a trigger-processing example in accordance with the disclosed embodiments.

The diagram in FIG. 3 illustrates how a list of triggers can be processed in accordance with the disclosed embodiments. Starting on the left side of FIG. 3, when a ticket changes, the system first evaluates trigger1 and as a result of this evaluation determines that the associated conditions are not met. Next, the system evaluates trigger2 and determines that the associated conditions are met. This causes trigger2 to fire, which causes the ticket to be updated. Next, the system evaluates trigger1 again and determines that the conditions are not met. It then skips trigger2 because trigger2 has already fired, and evaluates trigger3 and determines that the conditions are not met. Next, the system evaluates trigger4 and determines that the conditions are met, which causes trigger4 to fire and update the ticket. The system then evaluates trigger1 again and determines that the conditions are not met. It skips trigger2 because trigger2 has already fired. The system then evaluates trigger3 and determines that the conditions are met. This causes trigger3 to fire, which updates the ticket. Finally, the system evaluates trigger1 again and determines that the conditions are not met. Also, all of the other triggers have fired, so the processing of the ticket is complete. The system then repeats the process when another ticket changes.

To facilitate this type of ticket processing, our system represents the conditions defined in each trigger as a "condition graph" comprised of condition nodes, wherein each condition node represents an expression, such as "Department is equal to Accounts." Each condition node exists in one of the following states: an undecided state in which the condition node has not been evaluated; a satisfied state in which the condition node has been evaluated and found to be satisfied; and an unsatisfied state in which the condition node has been evaluated and found to be unsatisfied.

Within a condition graph, an edge between two nodes represents the AND operand, and if a node has two or more edges, it has OR conditions. We store a mapping between each trigger identifier and its associated condition graph. We also store a mapping between each parameter/attribute of a ticket and a corresponding list pointer, which points to a linked list of pointers, wherein each pointer in the linked list points to a condition node in a condition graph, wherein the condition node depends on the parameter/attribute. These two mappings can be used to quickly determine which trigger gets fired, or whether no trigger gets fired.

While evaluating a condition graph, we start at the root node of the condition graph and perform a depth-first search and evaluate each condition node we encounter to determine whether the condition node is "satisfied" or "unsatisfied." (Note that unevaluated condition nodes are always in the "undecided" state.) While evaluating a condition graph, when we discover a path from the root of the condition graph that passes through satisfied nodes to reach a terminal node of the condition graph (also referred to as a "null node"), the condition graph is satisfied. In this case, we execute the associated action for the trigger. When the action is executed, it changes some of the parameters/attributes of the ticket, which can possibly cause the state of some condition nodes to change, which can affect associated trigger firings. Hence, we repeat the evaluation process starting with the first trigger but exclude any triggers that have been fired.

In our system, a trigger is represented as a set of one or more conditions and a set of one or more actions. If the set of conditions is satisfied, the system performs the set of actions. These actions can update the ticket state, which in turn may cause another trigger to fire. This process continues until no triggers are fired in a given round. (Note that a trigger that was fired in a preceding round is not processed in the current round.)

Figure 5:
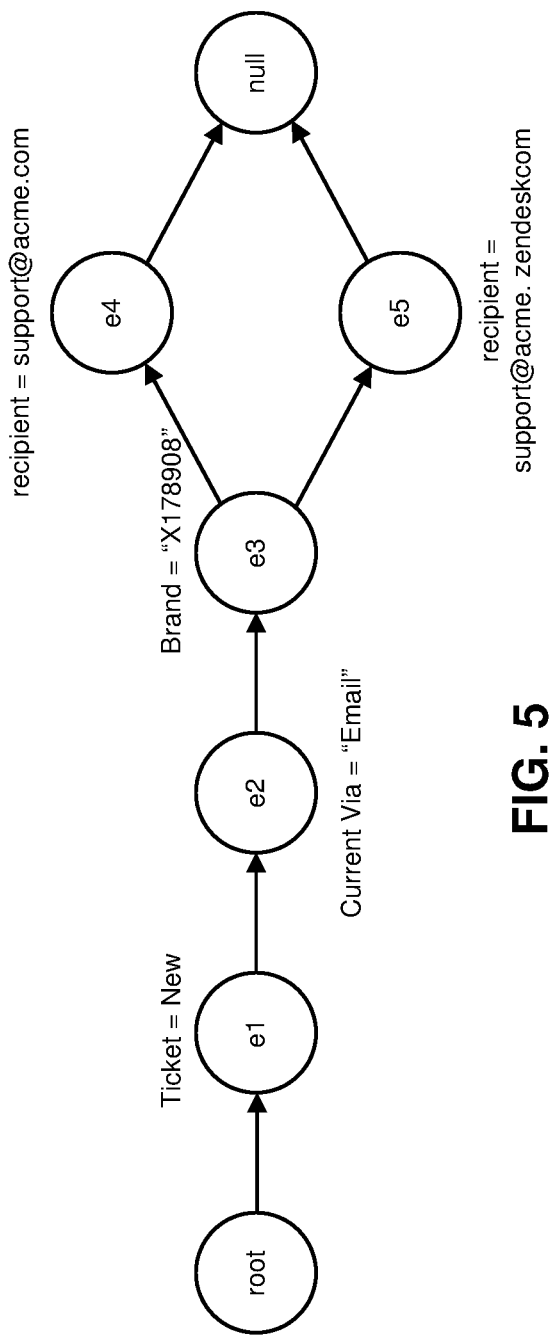
FIG. 5 illustrates a corresponding condition graph for the trigger that appears in FIG. 4 in accordance with the disclosed embodiments.

A typical trigger is illustrated in the example that appears in FIG. 4 and a corresponding condition graph is illustrated in FIG. 5. The trigger illustrated in FIG. 4 will fire if either of the following conditions is true.

Condition1: e1 AND e2 AND e3 AND e4
Condition2: e1 AND e2 AND e3 AND e5

The actions that are performed when the trigger fires can be represented as a set of instructions, which for example can comprise a series of setter operations on the ticket parameters.

Trigger Paths

Figure 6A:
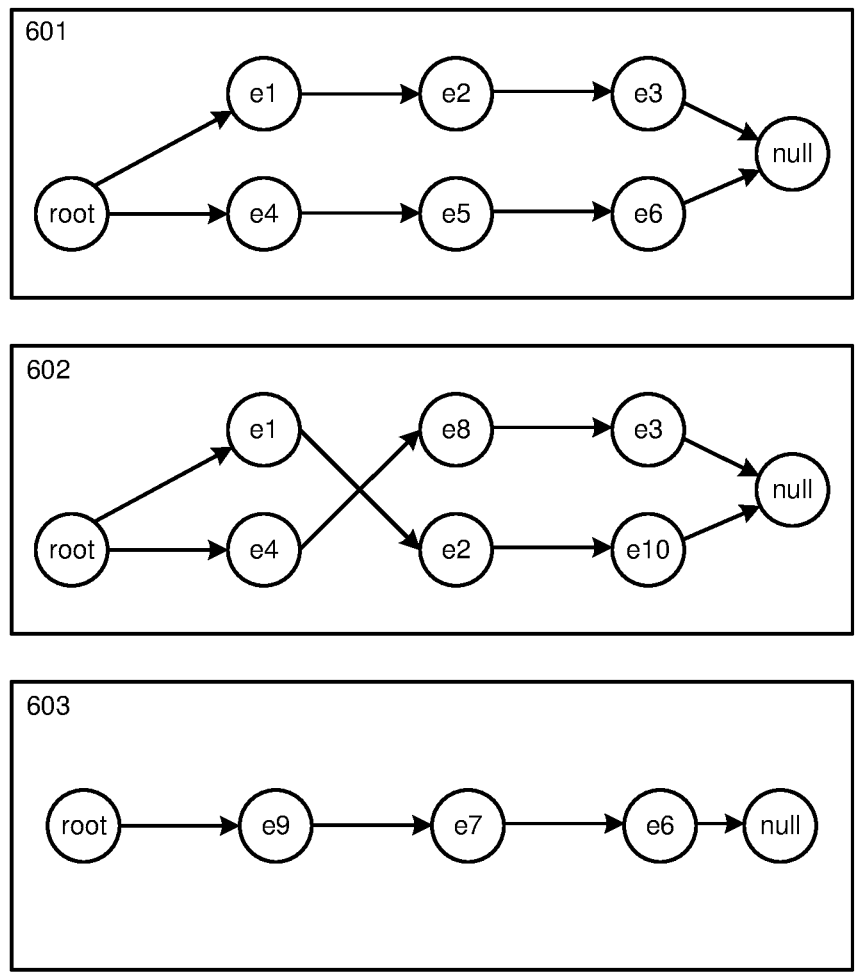
FIG. 6A illustrates three exemplary trigger graphs in accordance with the disclosed embodiments.
Figure 6B:
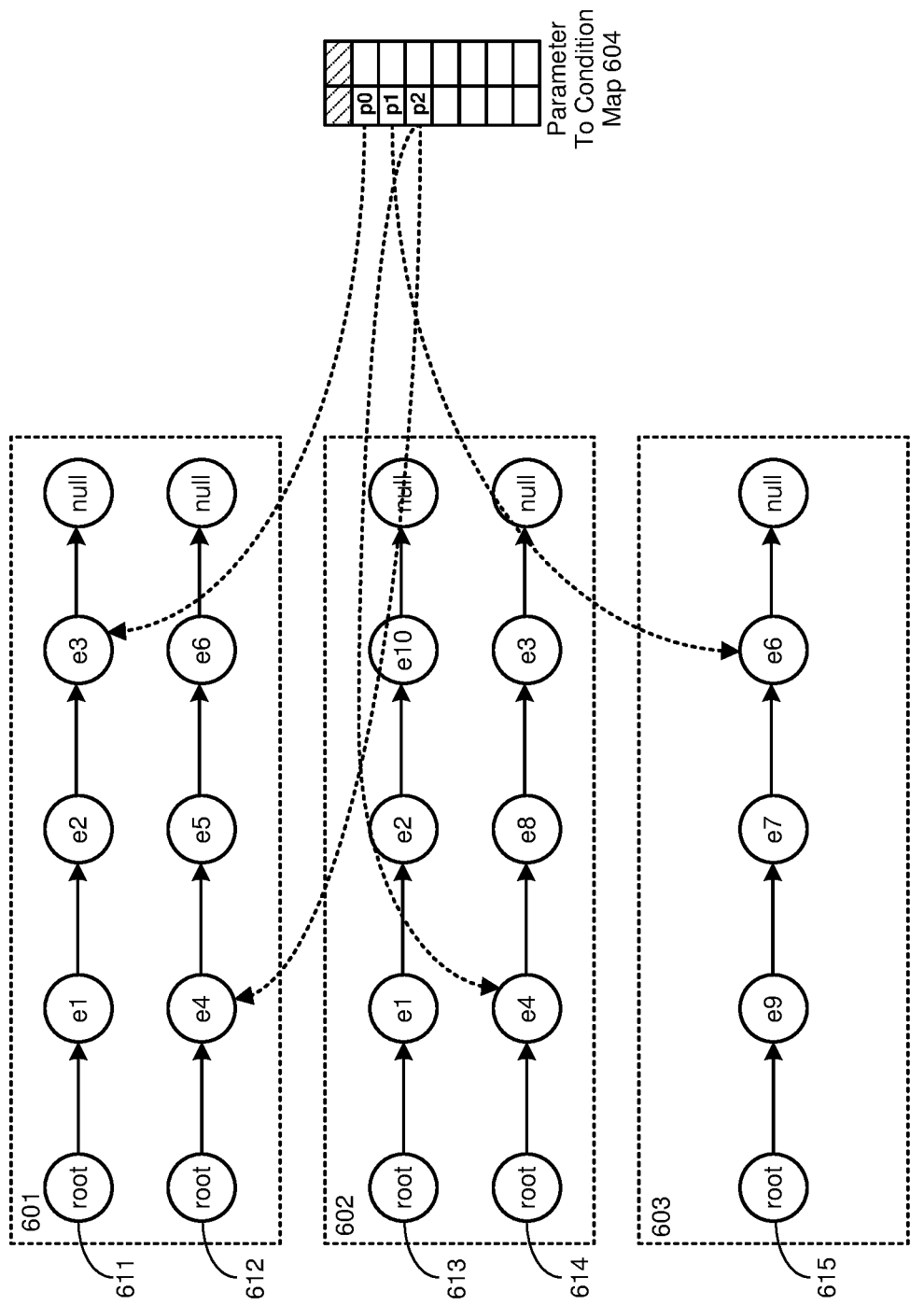
FIG. 6B illustrates trigger paths associated with the three trigger graphs illustrated in FIG. 6A in accordance with the disclosed embodiments.

To facilitate subsequent ticket-processing operations, a condition graph for a trigger can be decomposed into linear trigger paths that pass through condition nodes in the condition graph, as is illustrated in FIGS. 6A-6B. More specifically, FIG. 6A illustrates an exemplary set of three condition graphs 601-603, and FIG. 6B illustrates how condition graphs 601-603 can be decomposed into corresponding trigger graphs. This decomposition process involves traversing each condition graph from the root node to the null node and enumerating all possible paths. In the example illustrated in FIG. 6B, condition graph 601 is decomposed into two trigger paths 611-612, condition graph 602 is decomposed into two trigger paths 613-614, and condition graph 603 is decomposed into one trigger path 615. Note that each trigger graph can be represented by a data structure, which includes: (1) a trigger identifier, and (2) a list of associated condition nodes that are ANDed together. Note that for a trigger graph to be unsatisfiable, all trigger paths in it must be unsatisfiable, and for a path to be unsatisfiable there must be at least one unsatisfiable condition node on it. Moreover, if any one of these trigger paths is satisfied, the corresponding condition graph is also satisfied.

A parameter to condition map data structure 604 is also created, which maps each parameter to conditions that use the parameter. This data structure includes a frequency attribute for each parameter, which keeps track of the number of times each parameter is used across the condition graphs for all triggers. We also sort the entries in data structure 604 based on the frequency attributes in descending order. This makes it possible to easily determine which parameters are associated with a large number of condition nodes.

Transformation into an Interval Representation

Next, for a given parameter, we transform a set of condition nodes that depend on the parameter into an interval-based range set representation. Note that a condition can be represented as $C(p) \rightarrow p \, R \, v$, where $C(p)$ is a condition for the parameter p. The R symbol represents an operator for the condition, such as $==$, $\neq$, $\geq$, $\leq$, or !, and the parameter v is a constant for the condition, which is used to evaluate the condition with respect to the value of p.

The domain of v can be associated with a number of different data types, such as "integer," "float," "boolean," and "enum." Hence, during the transformation process, we convert the parameter v into a value in the real number domain between −infinity (−inf) and +infinity (+inf). If v is an "integer" or "float" data type, then the conversion process is straightforward because we can simply use the value of v as is. If v is an enum data type, then we use the range defined in the enum as integers. Finally, if v is a boolean data type, we use the boolean values 0 and 1 as integer values.

Figure 7:
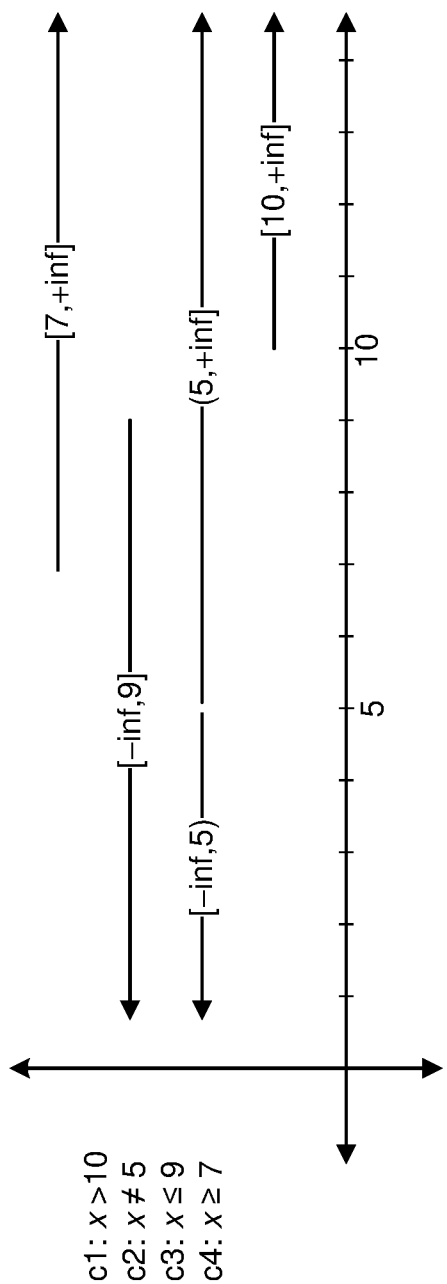
FIG. 7 illustrates intervals associated with an exemplary set of four conditions in accordance with the disclosed embodiments.

The graph that appears in FIG. 7 illustrates how four exemplary conditions (c1: $x>10$, c2: $x \neq 5$, c3: $x \leq 9$, and c4: $x \geq 7$) can be mapped onto corresponding real number intervals. More specifically, in FIG. 7: c1: $x>10$ is mapped into the interval $[10, +inf]$; c2: $x \neq 5$ is mapped into two intervals $[-inf, 5)$ and $(5, +inf]$; c3: $x \leq 9$ is mapped into the interval $[-inf, 9]$; and c4: $x \geq 7$ is mapped into the interval $[7, +inf]$. (Note that we can represent +inf using a very large positive number or a symbolic representation, and we can represent −inf using a very small negative number or a symbolic representation.)

Creating a Sequential Interval Set

Figure 8:
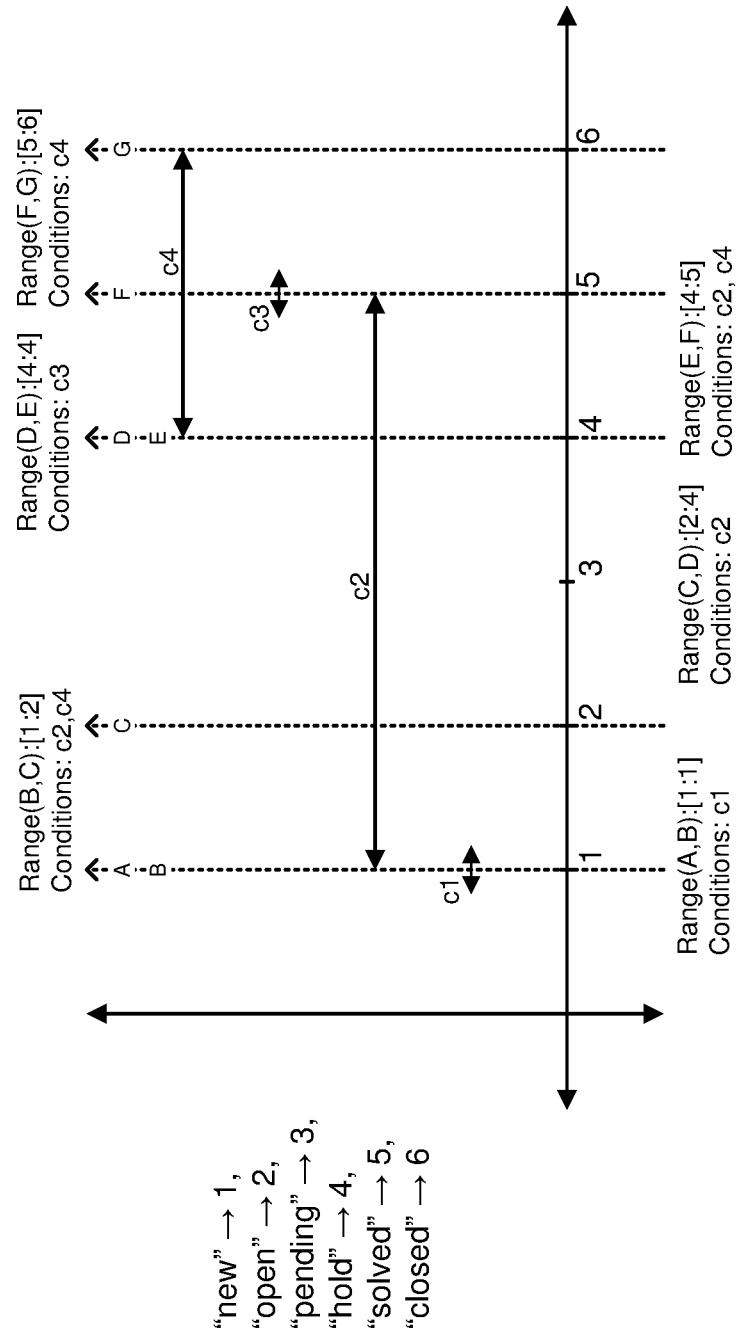
FIG. 8 illustrates a sequential range set associated with another exemplary set of four conditions for a ticket status parameter in accordance with the disclosed embodiments.

Once all conditions are transformed into intervals, we use them to create a sequential range set as is illustrated in FIG. 8. The example illustrated in FIG. 8 uses the ticket's "status" field as a parameter, which has an enum data type {new, open, pending, hold, solved, closed}, which is mapped to the integer values {1,2,3,4,5,6}.

To create an interval set, we first sort the points in the intervals in ascending order, wherein a data structure representing each of these points has the following attributes: (1) a reference to the interval ID to which it belongs, (2) a point value, and (3) an IsStart point boolean flag, which is true if it is the start point of the interval and is otherwise false. The data structure for an interval includes: (1) an upper bound for the interval, (2) a lower bound for the interval, and (3) an interval ID. Note that all condition nodes are transformed into corresponding intervals as is described above, and all the points of the intervals are stored in a list of points.

Next, we start a linear scan from the left-most point A, which is associated with the left-most dotted line in FIG. 8. We then collect all points in a RangeSet that starts at point A. Note that a corresponding RangeSet data structure includes: (1) an interval specification, and (2) a list of condition node IDs associated with the interval. We then find the next point in a left-to-right ordering of the points, which can be a start point or end point. Note that the next point B is also associated with the same dashed line as point A. This is because the condition c1 has the same start point and end point. We then close the RangeSet which was created at A by adding condition IDs that fall between A and B to the list of condition IDs, which in this case is the single condition ID "c1." Moreover, the range index for the corresponding interval is [1,1]. We then repeat the process moving right from B to C. This creates another range set with indexes [1,2] and conditions c2, c4. We repeat the process again moving from C to D, creating another range set with indexes [2,4] and conditions c2. The next range set for D to E has indexes [4,4] and conditions c3, and the next range set for E to F has indexes [4,5] and conditions c4, c2. Finally, the range set for F to G has indexes [5,6] and conditions c4. At the end of this process, the range indexes are $[(1,1),(1,2),(2,4),(4,4),(4,5),(5,6)] \rightarrow [1,1,2,4,4,5,6]$.

Note that the associated intervals are sequential and non-overlapping.

Using Range Searching to Quickly Evaluate Conditions

After creating an interval set for a parameter, it is possible to quickly evaluate the conditions associated with the parameter without actually performing computations to evaluate each individual condition. Instead, a binary search can be performed based on the range indexes to identify a relevant range set, which is associated with one or more valid conditions. For example, for the range set illustrated in FIG. 8, the parameter value $x=4$ is associated with the intervals (2,4), (4,4) and (4,5), so the binary search operation and an associated merging operation will produce the conditions c4, c3, c2. Exemplary pseudocode for this evaluation process (including the searching and merging operations) appears in FIGS. 9A-9B.

The above-described quick condition evaluation technique can be used to speed up processing operations associated with triggers. During this process, the quick condition evaluation technique can be used to determine a set of satisfied condition nodes for a frequently occurring parameter based on a specific parameter value. Next, a set of unsatisfied condition nodes for the parameter can be determined by subtracting the set of satisfied condition nodes from the list of all condition nodes associated with the parameter value. Finally, any trigger path that contains an unsatisfied condition node can be excluded from evaluation while applying the set of triggers to the ticket, which can greatly speed up associated trigger processing operations.

Adapting Trigger Execution with Sequential Intervals

We now describe how to apply the sequential interval method to speed up trigger execution during execution of the standard technique, as well as the fast trigger technique. The pseudocode below illustrates how the standard trigger execution technique works.

1. Initialize AppliedSet to Empty set.//This will contain applied triggers.
2. Initialize trigger_list to list of triggers
3. For each trigger T in trigger_list:
   a. Skip T if T is in AppliedSet
   b. Skip T If T does not match the ticket. (This evaluates the conditions in T to check if ticket matches T)
   c. Add T to AppliedSet
   d. Apply trigger T on ticket
   e. Go to Step 3.//which starts the loop from index 0 of trigger_list
4. Done.

We now describe how we can perform fast evaluation based on sequential intervals into this standard technique.

Preprocessing

The fast evaluation technique involves preprocessing operations, which can be performed at the time of trigger creation, trigger update, or trigger deletion. After these preprocessing operations are performed, the results saved in a database for later use during trigger execution.

The preprocessing phase is broken down into the following steps.

1. Identifying the "critical conditions set" for all triggers.
2. Selecting parameters to apply this technique.
3. For each selected parameter P, creating sequential intervals from the critical conditions set for P.
4. Creating a sequential intervals to OFF triggers map.
5. Merging sequential intervals and updating the sequential intervals to OFF Triggers map.

Critical Conditions of a Trigger

"Critical conditions" are conditions for which the whole trigger will be false if the condition evaluates to false. For example, FIG. 10A illustrates the condition graph for the following trigger.

T1: IF c1 AND (c2 OR c3) AND c4 THEN apply actions ( . . . )

In this example, c1 and c4 are critical conditions for the trigger. Note that c2 can be false, and the trigger could be true if c3 is true. (The same is true for c3 versus c2).

In another example, FIG. 10B illustrates a condition graph for the following trigger.

T2: IF (c1 OR c2 OR c3) THEN apply actions ( . . . )

In this example, there are NO critical conditions because for each condition there always exist alternate paths for this trigger to be true.

If you look closely, we can compute critical conditions if we examine all the paths through the condition graph for each trigger. For T1, the paths are (→C1→C2→C4→) and (→C1→C3→C4→). For T2, the paths are: (→C1→), (→C2→) and (→C3→).

Recall that critical conditions are those conditions, which appear in all paths for through a condition graph for a trigger. Hence, the procedure for finding a critical condition set (CCS) for a given trigger set TS can be described as follows.

1. Initialize Critical Condition Set CCS to Empty set.
2. For trigger T in trigger set TS:
   a. Construct trigger graph G for a T.
   b. Decompose trigger Graph G into set of Paths PS (PathSet)
   c. For each condition C in trigger T:
      i. If C is in all paths in PS, then add C to Critical Condition Set CCS.
3. Return CCS.

Parameter Selection Process

The parameter selection process uses the idea of stack ranking, and we also apply heuristics to control the process. The idea is to go through all possible parameters and select some of them based on what we find in the CCS for a given parameter P. This process is described in more detail in the pseudocode that appears below.

1. Initialize SelectedParamSet to Empty
2. For each parameter P
   a. Find all critical conditions in Critical Condition Set CCS which depend on P.
   b. Add P to SelectedParamSet if heuristic(CriticalConditions)

An example heuristic function is:

1. From CriticalConditions, find the set of parent triggers.
2. If this set's size is >10% of size of the set of all triggers, then return TRUE.
3. Else, return FALSE.

Note that this heuristic effectively only picks high impact parameters, which are present in critical conditions for a significant percentage of triggers. Note that this determination of whether or not to use a parameter P can alternatively be deferred to the evaluation phase.

The technique then proceeds to iterate through the list of selected parameters as is described below.

Creating the Sequential Intervals for P from the CCS for P

The process of creating sequential intervals is briefly described in step 3 and 4 in the preprocessing section above. In the following discussion, we use MIN_VALUE and MAX_VALUE to represent the minimum and maximum possible legal values for the parameter p. Note that we are describing a slightly different set of procedures from Step 3 to make it easier to understand for the following merge step. We also deal with "open intervals" and "closed intervals," which are represented with their usual mathematical notation:

(1,5) is an open interval and does not include 1 and 5. Hence, only 2, 3, 4 are included.

[1,5] is a closed interval which includes 1 and 5. Hence, 1,2,3,4,5 are included.

(1,5] is open on the left side, and closed on the right side. Thus, 2,3,4,5 are included.

[1,5) is closed on the left side, and open on the right side. Thus, 1,2,3,4 are included.

This is how a condition "p operator v" breaks down into intervals. Once we have the intervals, we can track their boundaries in a set as illustrated in the table that appears in FIG. 11. Note that we refer to intervals generated from conditions as "condition intervals" because we will soon be dealing with a different type of intervals called "sequential intervals."

Using the rule table illustrated in FIG. 11, we can compute condition_intervals_for(condition C) and boundaries_for (condition C), for a given condition C.

Assume for a given parameter P, we have collected all the boundaries from all the critical conditions for P in all triggers into a sorted set B(P). We then compute the sequential intervals for parameter P from B(P) as follows.

If the sorted boundaries set for parameter P, B(P) is {a, b, c}, then sequential intervals SI(P) is the list { [a,a], (a,b), [b,b], (b,c), [c,c]}.

The list of sequential intervals has a number of characteristics, including the following:

1. They are sequential and sorted so that each interval is adjacent to the next one.
2. They are not overlapping with each other.
3. They cover the entire distance from a to c.
4. Every boundary point becomes a closed interval including only itself.
5. The other intervals are all open and span the spaces between the boundaries.

Note that these characteristics are designed to make it easier to deal with the following merging step.

Now we can put the process together as follows.

1. For each parameter P in SelectedParam:
   a. Compute B(P) as the sorted set of Boundaries for parameter P
   b. Compute Sequential Intervals SI(P) from B(P)

Each step of the above steps can be broken down as follows.

Get Sorted Set of Boundaries for Parameter P

1. Let CCS(P) be the set of critical conditions depending on the parameter P.
2. Let B(P) be an empty set denoting the sorted boundary set for parameter P.

3. For each condition C in CCS(P):
   a. Add boundaries_for(C) to B(P)
4. Add MIN_VALUE and MAX_VALUE to B(P)
5. Sort B(P) in ascending order.

Get Sequential Intervals from B(P):
1. Let SI(P) be an empty list denoting the sequential interval list for parameter P.
2. Let F be the first boundary in B(P).
3. Add interval [F, F] to SI(P).
4. Let REST be the list B(P) with F removed.//All but the first element.
5. For each boundary N from REST:
   a. Add (F, N) to SI(P)
   b. Add [N, N] to SI(P)
6. Let F=N and continue to the next iteration.

At the end of this step, for each selected parameter P, we have a sequential interval list SI(P)

Creating the Sequential Intervals to OFF Triggers Map

Recall that each of these sequential intervals were computed from boundaries of critical conditions. Hence, when critical conditions evaluate to false, the whole trigger will be false. It is now time to put those two ideas together.

This step takes the sequential intervals for parameter P:SI(P) and maps each sequential interval to the list of triggers, which will become false if the value of P falls in that interval. To do this, we need to first understand the relationship between a "sequential interval" and a "condition interval set."

Coverage of a Condition

As described above with reference to the "condition intervals" table illustrated in FIG. 11, each condition breaks down into a set of condition intervals. If we look closely, we notice that a condition interval can never be smaller than a sequential interval. They can overlap, but the sequential interval will always be completely inside a condition interval.

Figures 12A, 12B:
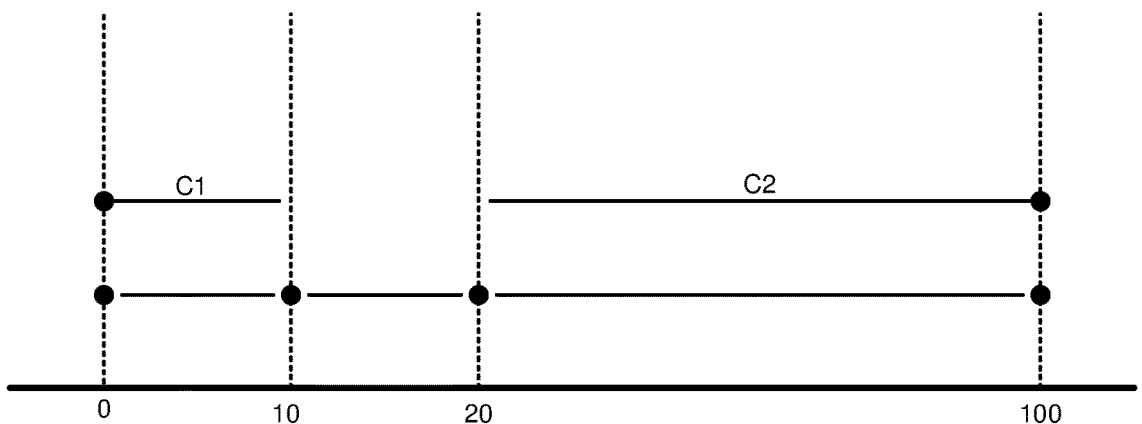
FIG. 12A presents a table listing condition intervals and sequential intervals in accordance with the disclosed embodiments.
FIG. 12B presents a graph illustrating the condition intervals and sequential intervals in accordance with the disclosed embodiments.

For simplicity, assume MIN_VALUE is 0 and MAX_VALUE is 100 for the following examples. The first example is illustrated in the table that appears in FIG. 12A and the graph that appears in FIG. 12B. In the graph in FIG. 12B, the upper lines C1 and C2 represent condition intervals and the lower lines represent sequential intervals. The circles on the diagram indicate the closed nature of an interval boundary. As you can see, all sequential intervals are either completely inside a condition interval or completely outside.

Figures 13A, 13B:
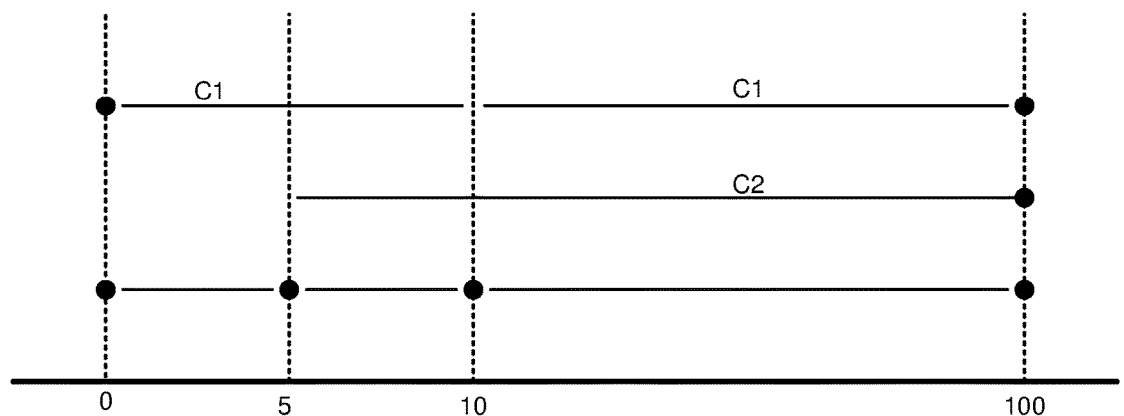
FIG. 13A presents another table listing condition intervals and sequential intervals in accordance with the disclosed embodiments.
FIG. 13B presents a graph illustrating the condition intervals and sequential intervals in accordance with the disclosed embodiments.

A second example is illustrated in the table that appears in FIG. 13A and the graph that appears in FIG. 13B. In this case, we need to find sequential intervals, which do not fall inside any of the condition intervals for a given condition C. These are represented under the "Excluded sequential intervals" column in the table in FIG. 13A. Note that for a given condition C, these excluded sequential intervals will not fall inside any of the condition intervals for C. If the value falls within those intervals, the condition C will be false, and the parent trigger for C will be false. We collect the triggers for each of the sequential intervals, and create a mapping between a given sequential interval for P and the set of triggers, which will be false if the value falls in that sequential interval. We do this by inspecting each critical condition C (one at a time) for a given parameter P along with the sequential interval set SI(P) for P.

Before we proceed, we specify how to check for "coverage" of a sequential interval inside a condition interval in the pseudocode that appears below.

interval_covers?(CI, SI):
1. // SI is fully inside CI
2. Return TRUE if CI.left<SI.left AND SI.right<CI.right
3. // SI and CI are overlapping with edges protruding.
4. Return FALSE if SI.left<CI.left OR CI.right<SI.right
5. # CI edge excludes, but SI edge includes
6. Return false if CI.right==SI.right AND !CI.includes_right AND SI.includes_right
7. Return false if CI.left==SI.left && !CI.includes left AND SI.includes_left
8. Return true # exactly equal on any one or both of the ends condition_excludes?(C, SI):
1. For any condition interval CI in condition_intervals(C):
2. Return FALSE if interval_covers?(CI, SI)
3. Return TRUE Note that if any of the condition intervals for condition C contains the given sequential interval, we cannot exclude the sequential interval for that condition.

Now we proceed with the process of mapping the unsatisfiable triggers to each sequential interval, given a parameter P. Operations performed during this mapping process are illustrated in the pseudocode that appears below. We will call these unsatisfiable triggers, "OFF triggers" from now on.

Mapping OFF Triggers to Sequential Intervals Given a Parameter P:
1. Let OFF be an empty map, with key type (Parameter, Seq. Interval) and value type sorted list of triggers.
2. For each parameter P in SelectedParam do
   a. Let CCS(P) be the set of critical conditions from all triggers related to Parameter P.
   b. Let SI(P) be the set of sequential intervals for parameter P
   c. For each condition C in CCS(P)
      i. Let ExcludedSeqIntervals=List of sequential intervals from SI(P) where condition_excludes?(C, seq. interval) is true.
      ii. For each ExcludedSeqInterval ESI, Add C's parent trigger to set of OFF triggers for parameter P and sequential interval ESI, OFF(P, ESI)

Note that while saving the sequential intervals to a database, we can save them in a format, such as the format that appears in the table in FIG. 14A. Also, note that during evaluation, we will always use a parameter name and a specific sequential interval to look up a list of triggers.

Merging Sequential Intervals and the OFF triggers map (Optimization)

In this step, given a parameter P, we walk through the OFF triggers map, and merge consecutive sequential intervals whenever the list of triggers for those two sequential intervals are identical.

Please refer to the example illustrated by the table in FIG. 14B. Note that half open/closed intervals start making appearances here. Moreover, both the OFF triggers map and the sequential intervals for parameter P, are updated after the merging process. During this merging process, we only merge intervals together, if: (1) they are adjacent to each other (they share one interval's right boundary with the other interval's left boundary); and (2) the set of triggers they map to are the same.

This can be achieved by walking through the list of sequential intervals for parameter P, and performing the merge operation with the next interval in the list, if the above two conditions are met. This process is described in more detail by the pseudocode below.

1. Let SI(P) be the sequential intervals for parameter P.
2. Let NEW_SI(P) be an empty set of sequential intervals.
3. Let F be the first interval in SI(P).
4. Let REST be the intervals in SI(P) with F removed.

5. For each interval N in REST
   a. If off_triggers_for(F) and off_triggers_for(N) are same, AND F and N are adjacent
      i. Let F be reassigned as F and N merged.
      ii. Update off_triggers_for(F) to be off_triggers_for(N) and remove N from off_triggers map.
   b. Else
      i. Add F to NEW_SI(P).
      ii. Let F be N.
6. Add F to NEW_SI(P)//maybe the first and only interval, final merged interval or the last interval.
7. Reassign SI(P)=NEW_SI(P).

With this step, the preprocessing is now complete, and for given a set of triggers TS, we have:

1. Sequential intervals for a parameter P, SI(P) for each parameter; and
2. an OFF_triggers(P, SI) map, which is indexed by a parameter P and a sequential interval SI, and whose values are sets of triggers which are OFF if P is within the interval SI.

Executing Triggers

Now we explain how we can use the above two sets of data structures to speed up trigger execution. The basic idea is identifying triggers which are going to be FALSE given a parameter's value very quickly (e.g., in O(logN) time, where N is the number of conditions). We first introduce a procedure that finds OFF triggers given a parameter and a value from a ticket.

Finding OFF Triggers Given a Parameter and a Value from a Ticket

Note that when a ticket is presented for trigger execution, we actually know the values of a parameter. Now that we have the sequential intervals SI(P) and the OFF triggers map, given P and a Sequential interval SI, we can find the triggers that are OFF very quickly. This process is summarized in the two steps that appear below.

find_off_triggers(Parameter P, value v):
1. From the sequential intervals SI(P), find the interval SI which contains the value v.
2. From the OFF_Triggers(P, SI) map, find the set of triggers.

The speed comes from the fact that we can search through SI(P) for an interval, which contains value v, in log(N) time using a binary search. Note that the sequential intervals are already ordered left to the right from MIN_VALUE to MAX_VALUE.

Given that we can quickly find OFF triggers for a given parameter P at value v, we can use this to speed up trigger evaluation. We do this by tracking the OFF triggers in a set with the following procedure called "Tracking OFF Triggers," which continuously performs updates as triggers are applied and values change.

Tracking OFF Triggers through Changes to Parameter Values

Before evaluating the triggers, we first identify all OFF triggers and remove them from consideration. Note that matching triggers will eventually be selected for application on the ticket, and they will change values. So, we need a way to keep the tracked set of OFF triggers updated. We can use the following three sets of data structures to perform the tracking.

1. OFF_triggers set: This keeps the set of triggers which we have deduced to be OFF (i.e, not satisfiable).
2. params_to_OFF_triggers map: This tracks, given a parameter, the set of triggers which are OFF.
3. OFF_triggers_to_params map: This map tracks, given a trigger, a set of which parameters are keeping it OFF.

Please refer to the procedures that appear below, which let us track all three data structures in synchrony.

mark_off(trigger t, param p):
Add trigger t to the set OFF_triggers
Add param p to the set OFF_triggers_to_params(t)
Add trigger t to the set params_to_OFF_triggers(p)

mark_unsure(trigger t, param p):
Remove param p from the set OFF_triggers_to_params(t)
Remove trigger t from the set params_to_OFF_triggers(p)
if OFF_triggers_to_params(t) is empty, then Remove trigger t from the set OFF_triggers Hence, given a set of values and parameters, we can mark triggers that are off in a continuous fashion, as follows:

update_off_triggers(parameter set PS, value set VS):
1. For each parameter P in set PS
   a. Let V be the value for the parameter VS(P)
   b. // Find existing off triggers and remove them
   c. Let old_off_triggers=params_to_OFF_triggers(p)
   d. For each trigger T in old_off_triggers, do mark_unsure(T, P)
   e. // find the new off triggers using value V
   f. Let new_off_triggers=find_off_triggers(P, V)
   g. For each trigger T in new_off_triggers, do mark_off(T, P)

Note that we can optimize the process of removing old_off_triggers and adding new_off_triggers because many of these triggers are likely to be OFF for the new value as well. So, technically we only need to mark_unsure those triggers that are in the set old_off_triggers—new_off_triggers, and only need to mark_off those triggers that are in the set new_off_triggers—old_off_triggers. This requires us to compute both set differences. To do this, we can use a technique, such as "array-merge" where we iterate through two sorted lists at the same time and avoid changing triggers that are OFF on both cases.

Including OFF Triggers in the Standard Technique

Note that we can inject the above-described optimization in two ways:
1. Tracking all OFF triggers initially, and also when values change on application of triggers; and
2. Avoiding a trigger in the OFF_triggers set when we try and look for the next trigger.

This process is outlined in the following pseudocode.
1. Initialize AppliedSet to Empty set. //This will contain triggers that were applied.
2. Initialize TS to list of triggers
3. update_off_triggers(all parameters, ticket as a value map)
4. For each trigger T in trigger_list:
   a. Skip T if T is in AppliedSet
   b. Skip T if T is in OFF_triggers set
   c. Skip T If T does not match the ticket. (This evaluates the conditions in T to check if ticket matches T.)
   d. Add T to AppliedSet
   e. Apply trigger T on ticket
   f. update_off_triggers(changed_parameters, new values for those parameters as a map)
   g. Goto Step 3. //which starts the loop from index 0 of trigger_list
5. Done.

Including OFF Triggers into Fast Graph Based Evaluation Technique

Adding the optimization to the fast graph based technique is similar to how it is applied to the standard technique.

The fast graph technique can be broken down into the following steps:
1. Preprocessing
2. Find Green Path
3. Action
4. Uncolor nodes
5. Go to step 2.

The new steps are:
1. Preprocessing+OFF trigger preprocessing: (We introduce our optimization after Step1)
2. update_off_triggers(all parameters, ticket as a value map)
3. Step 2: FIND green path in a graph: We update this step to avoid any trigger that is OFF before we try and find a green path.
4. Action
5. Uncolor nodes
6. update_off_triggers(changed parameters, values for the changed parameters)
7. Go to step 3

Trigger-Related Processing Operations

Figure 15C:
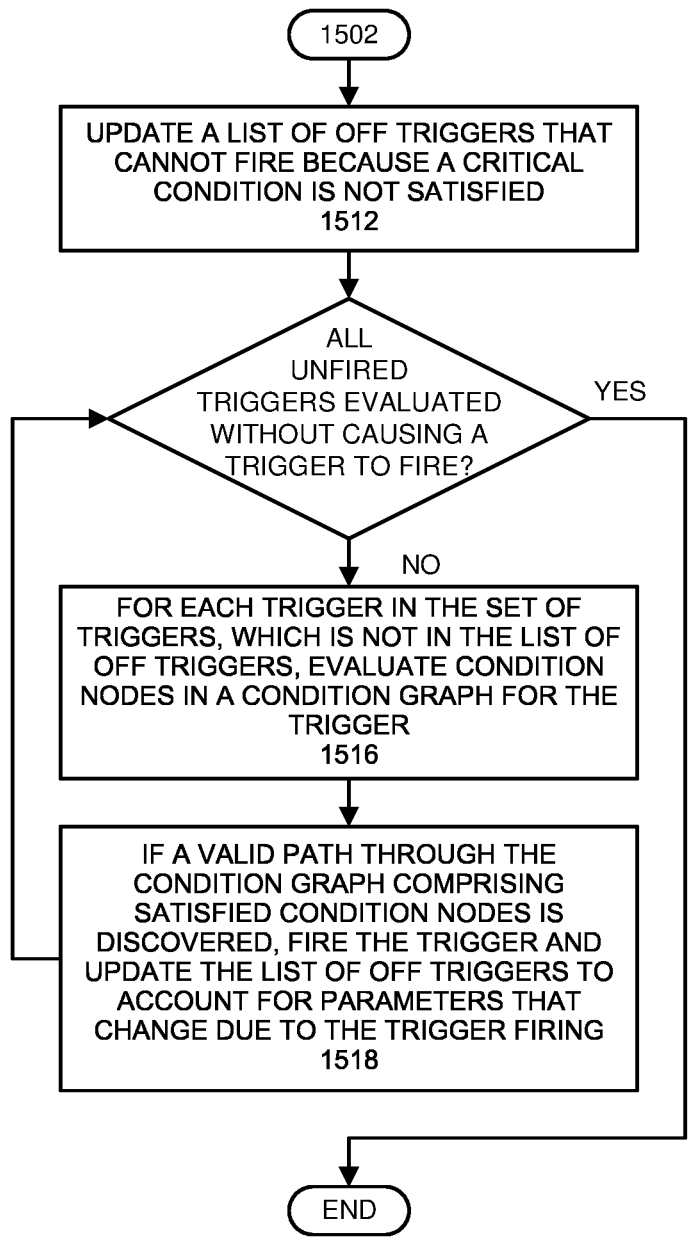
FIG. 15C presents a flow chart illustrating an alternative set of operations performed while applying the set of triggers to a ticket in accordance with the disclosed embodiments.

FIGS. 15A-15C present flow charts illustrating operations performed while applying a set of triggers to a ticket in accordance with the disclosed embodiments. First, referring to FIG. 15A, when a customer-support ticket is created or updated, the system applies a set of triggers, which modify the ticket based on business rules, to the ticket, wherein each trigger in the set of triggers performs one or more actions that modify the ticket when conditions for parameters associated with the ticket are satisfied, and wherein a condition graph for a trigger is a directed graph comprised of condition nodes that specify conditions on one or more parameters associated with the ticket (step 1502).

While applying the set of triggers to the ticket in step 1502, the system processes the set of triggers as is illustrated in FIG. 15B. During this process, the system evaluates condition nodes in condition graphs for the set of triggers (step 1504). While evaluating the condition nodes in the condition graphs, the system performs one or more range-searching operations to quickly evaluate condition nodes for frequently occurring parameters in the condition graphs (step 1506). (Note that because of the overhead involved in constructing and using a range set, it only makes sense to use this range-searching technique for frequently occurring parameters. Conditions associated with less frequently occurring parameters should be directly evaluated.) During the evaluation process, if a valid path through a condition graph comprising satisfied condition nodes is discovered, the system fires a trigger associated with the condition graph (step 1508). After the evaluation process, the system marks a condition graph as unsatisfiable if all possible paths through the condition graph are blocked by an unsatisfied critical condition node, wherein unsatisfiable condition graphs are not evaluated while applying the set of triggers to the ticket (step 1510).

In an alternative embodiment, while applying the set of triggers to the ticket in step 1502, the system processes the set of triggers as is illustrated in FIG. 15C. During this process, while applying the set of triggers to the ticket, the system first updates a list of off triggers that cannot fire because a critical condition is not satisfied (step 1512). Next, the system iteratively performs the following operations until all unfired triggers in the set of triggers have been evaluated without causing a trigger to fire. For each trigger in the set of triggers, which is not in the list of off triggers, the system evaluates condition nodes in a condition graph for the trigger (step 1516). Next, if a valid path through the condition graph comprising satisfied condition nodes is discovered, the system fires the trigger and updates the list of off triggers to account for parameters that change due to the trigger firing (step 1518).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for automatically updating a customer-support ticket in an online customer-support system, comprising:
   when the customer-support ticket is created or updated, applying a set of triggers, which modify the ticket based on business rules, to the ticket;
   wherein each trigger in the set of triggers performs one or more actions that modify the ticket when conditions for parameters associated with the ticket are satisfied; and
   wherein applying the set of triggers involves,
      evaluating condition nodes in condition graphs for the set of triggers, wherein a condition graph for a trigger is a directed graph comprised of condition nodes that specify conditions on one or more parameters associated with the ticket,
      wherein evaluating the condition nodes in the condition graphs involves performing one or more range-searching operations to quickly evaluate condition nodes for frequently occurring parameters in the condition graphs, and
      if a valid path through a condition graph comprising satisfied condition nodes is discovered, firing a trigger associated with the condition graph.

2. The method of claim 1, wherein the method further comprises marking a condition graph as unsatisfiable if all possible paths through the condition graph are blocked by an unsatisfied critical condition node, wherein unsatisfiable condition graphs are not evaluated while applying the set of triggers to the ticket.

3. The method of claim 1, wherein the one or more range-searching operations are performed during runtime, after trigger firings cause frequently occurring parameters to be modified.

4. The method of claim 1, wherein the method further comprises performing preprocessing operations to identify critical condition nodes, and to perform range computations to produce range sets and associated range indexes for frequently occurring parameters associated with critical condition nodes, which facilitates subsequent range-searching operations.

5. The method of claim 4, wherein performing a range-searching operation involves performing a binary search for a parameter value based on range indexes to quickly evaluate conditions by accessing associated range sets.

6. The method of claim 1, wherein prior to runtime, the method further comprises:

converting each condition graph into one or more linear trigger paths through condition nodes in the condition graph;

wherein the one or more trigger paths are subsequently evaluated to determine whether the associated trigger will fire; and wherein a trigger path becomes unsatisfiable whenever a condition node in the trigger path is evaluated as unsatisfied, wherein unsatisfiable trigger paths are not evaluated while applying the set of triggers to the ticket.

7. The method of claim 1, wherein triggers in the set of triggers are applied to the ticket in a precedence ordering.

8. The method of claim 7, wherein after a ticket is updated as a result of firing a trigger, the method further comprises:
identifying one or more parameters in the ticket that were modified by the trigger;
unmarking condition nodes that depend on the modified parameters, wherein the unmarking process sets a condition node to be in an undecided state; and
continuing to apply the set of triggers to the ticket restarting at the beginning of the precedence ordering while removing the fired trigger from future consideration.

9. The method of claim 8, wherein the method further comprises completing the process of applying the set of triggers to the ticket when all unfired triggers in the set of triggers have been evaluated without causing a trigger to fire.

10. The method of claim 1, wherein a trigger can be associated with one or more of the following actions:
changing a priority of a ticket;
changing an assignee for the ticket;
assigning a group of customer-support agents to the ticket;
changing a state in a life cycle of the ticket; and
changing a ticket type for the ticket.

11. The method of claim 1, wherein a trigger can be associated with conditions that are based on the following:
a status of the ticket;
a language of the ticket;
a requester who caused the ticket to be created;
a brand associated with the ticket; and
how the ticket arrived at the customer-support system.

12. A non-transitory computer-readable storage medium storing instructions that when executed by a computer cause the computer to perform a method for automatically updating a customer-support ticket in an online customer-support system, the method comprising:
when the customer-support ticket is created or updated, applying a set of triggers, which modify the ticket based on business rules, to the ticket;
wherein each trigger in the set of triggers performs one or more actions that modify the ticket when conditions for parameters associated with the ticket are satisfied; and
wherein applying the set of triggers involves,
evaluating condition nodes in condition graphs for the set of triggers, wherein a condition graph for a trigger is a directed graph comprised of condition nodes that specify conditions on one or more parameters associated with the ticket,
wherein evaluating the condition nodes in the condition graphs involves performing one or more range-searching operations to quickly evaluate condition nodes for frequently occurring parameters in the condition graphs, and
if a valid path through a condition graph comprising satisfied condition nodes is discovered, firing a trigger associated with the condition graph.

13. The non-transitory computer-readable storage medium of claim 12, wherein the method further comprises marking a condition graph as unsatisfiable if all possible paths through the condition graph are blocked by an unsatisfied critical condition node, wherein unsatisfiable condition graphs are not evaluated while applying the set of triggers to the ticket.

14. The non-transitory computer-readable storage medium of claim 12, wherein the one or more range-searching operations are performed during runtime, after trigger firings cause frequently occurring parameters to be modified.

15. The non-transitory computer-readable storage medium of claim 12, wherein the method further comprises performing preprocessing operations to identify critical condition nodes, and to perform range computations to produce range sets and associated range indexes for frequently occurring parameters associated with critical condition nodes, which facilitates subsequent range-searching operations.

16. The non-transitory computer-readable storage medium of claim 15, wherein performing a range-searching operation involves performing a binary search for a parameter value based on range indexes to quickly evaluate conditions by accessing associated range sets.

17. The non-transitory computer-readable storage medium of claim 12, wherein prior to runtime, the method further comprises:
converting each condition graph into one or more linear trigger paths through condition nodes in the condition graph;
wherein the one or more trigger paths are subsequently evaluated to determine whether the associated trigger will fire; and
wherein a trigger path becomes unsatisfiable whenever a condition node in the trigger path is evaluated as unsatisfied, wherein unsatisfiable trigger paths are not evaluated while applying the set of triggers to the ticket.

18. The non-transitory computer-readable storage medium of claim 12, wherein triggers in the set of triggers are applied to the ticket in a precedence ordering.

19. The non-transitory computer-readable storage medium of claim 18, wherein after a ticket is updated as a result of firing a trigger, the method further comprises:
identifying one or more parameters in the ticket that were modified by the trigger;
unmarking condition nodes that depend on the modified parameters, wherein the unmarking process sets a condition node to be in an undecided state; and
continuing to apply the set of triggers to the ticket restarting at the beginning of the precedence ordering while removing the fired trigger from future consideration.

20. The non-transitory computer-readable storage medium of claim 19, wherein the method further comprises completing the process of applying the set of triggers to the ticket when all unfired triggers in the set of triggers have been evaluated without causing a trigger to fire.

21. A method for automatically updating a customer-support ticket in an online customer-support system, comprising:
when the customer-support ticket is created or updated, applying a set of triggers to the ticket, wherein each trigger in the set of triggers fires when conditions for parameters associated with the ticket are satisfied and performs one or more actions that modify the ticket, and wherein each trigger in the set of triggers is associated with a condition graph comprised of condition nodes that specify conditions on one or more parameters associated with the ticket;

wherein applying the set of triggers involves:
updating a list of off triggers that cannot fire because a critical condition is not satisfied; and performing the following operations until all unfired triggers in the set of triggers have been evaluated without causing a trigger to fire:
for each trigger in the set of triggers, which is not in the list of off triggers:
evaluating condition nodes in a condition graph for the trigger, and
if a valid path through the condition graph comprising satisfied condition nodes is discovered, firing the trigger and updating the list of off triggers to account for parameters that change due to the trigger firing; and performing the following preprocessing operations to facilitate updating the list of off triggers:
identifying a set of critical conditions for each trigger in the set of triggers, wherein a critical condition for a trigger appears in all paths through a condition graph for the trigger;
selecting a set of parameters to evaluate, wherein each selected parameter is associated with a critical condition that affects more than a threshold number of triggers;
for each selected parameter, creating sequential intervals for the parameter based on critical conditions associated with the parameter;
producing an off triggers map that maps each sequential interval to an associated set of off triggers; and
merging sequential intervals if possible, and updating the off triggers map accordingly.

22. The method of claim 21, wherein updating the list of off triggers involves performing range-searching operations to identify sequential intervals for critical parameters, and looking up the identified sequential intervals in the off triggers map to identify off triggers to include in the list of off triggers.

23. The method of claim 22, wherein performing the range-searching operations involves performing binary searches for parameter values based on a range sets and range indexes for the sequential intervals to quickly identify the sequential intervals associated with the off triggers.

24. A non-transitory computer-readable storage medium storing instructions that when executed by a computer cause the computer to perform a method for automatically updating a customer-support ticket in an online customer-support system, the method comprising:

when the customer-support ticket is created or updated, applying a set of triggers to the ticket, wherein each trigger in the set of triggers fires when conditions for parameters associated with the ticket are satisfied and performs one or more actions that modify the ticket, and wherein each trigger in the set of triggers is associated with a condition graph comprised of condition nodes that specify conditions on one or more parameters associated with the ticket;

wherein applying the set of triggers involves:
updating a list of off triggers that cannot fire because a critical condition is not satisfied;
performing the following operations until all unfired triggers in the set of triggers have been evaluated without causing a trigger to fire:
for each trigger in the set of triggers, which is not in the list of off triggers:
evaluating condition nodes in a condition graph for the trigger, and
if a valid path through the condition graph comprising satisfied condition nodes is discovered, firing the trigger and updating the list of off triggers to account for parameters that change due to the trigger firing; and performing the following preprocessing operations to facilitate updating the list of off triggers:
identifying a set of critical conditions for each trigger in the set of triggers, wherein a critical condition for a trigger appears in all paths through a condition graph for the trigger;
selecting a set of parameters to evaluate, wherein each selected parameter is associated with a critical condition that affects more than a threshold number of triggers;
for each selected parameter, creating sequential intervals for the parameter based on critical conditions associated with the parameter;
producing an off triggers map that maps each sequential interval to an associated set of off triggers; and
merging sequential intervals if possible, and updating the off triggers map accordingly.

25. The non-transitory computer-readable storage medium of claim 24, wherein updating the list of off triggers involves performing range-searching operations to identify sequential intervals for critical parameters, and looking up the identified sequential intervals in the off triggers map to identify off triggers to include in the list of off triggers.

26. The non-transitory computer-readable storage medium of claim 25, wherein performing the range-searching operations involves performing binary searches for parameter values based on a range sets and range indexes for the sequential intervals to quickly identify the sequential intervals associated with the off triggers.

* * * * *